United States Patent [19]

Ferrell

[11] 4,434,322

[45] Feb. 28, 1984

[54] CODED DATA TRANSMISSION SYSTEM

[75] Inventor: Philip J. Ferrell, Seattle, Wash.

[73] Assignee: Racal Data Communications Inc., Miami, Fla.

[21] Appl. No.: 286,356

[22] Filed: Jul. 23, 1981

Related U.S. Application Data

[63] Continuation of Ser. No. 481,021, Aug. 19, 1965, abandoned.

[51] Int. Cl.[3] .............................................. H04L 9/00

[52] U.S. Cl. ............................. 178/22.13; 178/22.14; 178/22.17; 455/26; 455/30

[58] Field of Search ............... 178/22.13, 22.14, 22.16, 178/22.17, 22.19; 371/39; 455/26, 30

[56] References Cited

U.S. PATENT DOCUMENTS

| | | | |
|---|---|---|---|
| 2,969,533 | 1/1961 | Shanahan | 340/347 DD |
| 2,993,089 | 7/1961 | Negri | 178/22.03 |
| 3,036,156 | 5/1962 | Gillespie | 178/22.13 |
| 3,038,028 | 6/1962 | Henze | 178/22.16 |
| 3,046,545 | 1/1962 | Westerfield | 340/5 DP |
| 3,093,707 | 6/1963 | Nicolson, Jr. et al. | 178/23 |
| 3,155,818 | 11/1964 | Goetz | 178/22.13 |
| 3,162,837 | 12/1964 | Meggitt | 371/39 |
| 3,305,636 | 2/1967 | Webb | 375/57 |
| 3,358,082 | 12/1967 | Helm | 370/92 |
| 3,380,029 | 4/1968 | Goetz | 364/300 |
| 3,394,224 | 6/1968 | Helm | 200/6 R |
| 3,421,146 | 1/1969 | Zeger et al. | 178/69 R |
| 3,678,198 | 7/1972 | Ehrat | 178/22.13 |
| 3,925,612 | 12/1975 | Guanella et al. | 178/22.13 |
| 3,958,214 | 5/1976 | Andrews, Jr. et al. | 178/22.14 |
| 4,187,392 | 2/1980 | Safford | 178/22.14 |
| 4,304,962 | 12/1981 | Fracassi et al. | 178/22.19 |

OTHER PUBLICATIONS

Proceedings of IRE, (10/58), vol. 46, No. 10, pp. 1741-1744, Green et al.

Huffman, Canonical Forms for Information—Lossless Finite-State Logical Machines, Transactions on Communications Tech., vol. 6, May 1957.

Golomb, Memorandum No. 20-189, On Factorization of Trinomials Over GF(2), JPL (1959).

Huffman, The Synthesis of Linear Sequential Coding Networks, reprinted as Chap. 1 in Linear Sequential Switching Circuits, Kautz Ed., Holden-Day Inc. (1965).

Huffman, Linear Circuit Viewpoint on Error-Correcting Codes, MIT (1956).

Peterson, Error Correcting Codes, MIT Press (1961).

Golomb, (Ed.) Digital Communications with Space Applications, Prentice-Hall, Inc., Chapters 1 and 2 and Appendix 3.

Huffman, Buyers'Guide, IRE Transactions on Circuit Theory, Mar. 1956.

*Primary Examiner*—Sal Cangialosi

*Attorney, Agent, or Firm*—Jackson, Jones & Price

[57] ABSTRACT

A scrambler/encryption system for randomizing an information-containing data signal for transmission and for reproducing at the receiver the information-containing data signal. The information-containing data to be transmitted is applied to a modulo-two adder, the output of which is the encoded data for transmission and which is also an input of an n stage shift register. An arbitrary logic network, having a plurality of inputs each connected to a plurality of selected shift register stages, produces a particular key signal responsive to the condition of the contents of the selected shift register stages. At the receiver, the received randomized data is fed simultaneously to the input of an n stage shift register and to an input of a modulo-two adder. An identical arbitrary logic network is connected to the receiver shift register and produces the same particular key signal responsive to the same conditions in the shift register. The modulo-two adder in the receiver has as its second input the key signal. Embodiments also show the use of the scrambler/encryption circuitry in other applications, i.e., rendering tamperproof recorded information, e.g., audio recording, and checking the operation of high speed shift registers.

40 Claims, 7 Drawing Figures

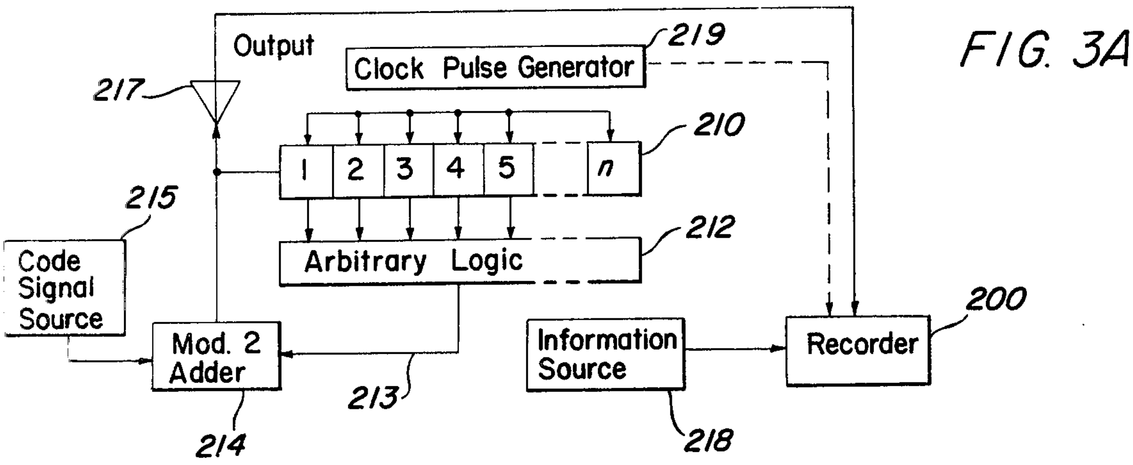
FIG. 3A
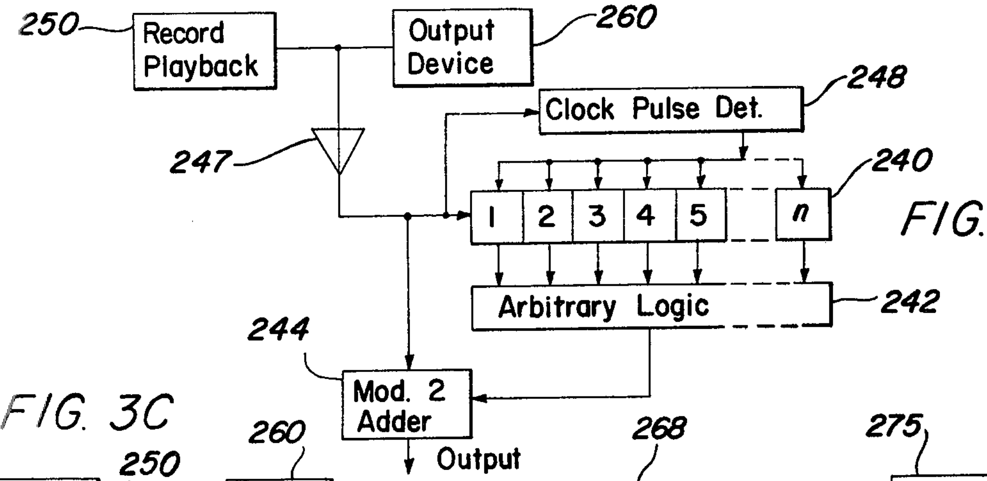
FIG. 3B
FIG. 3C
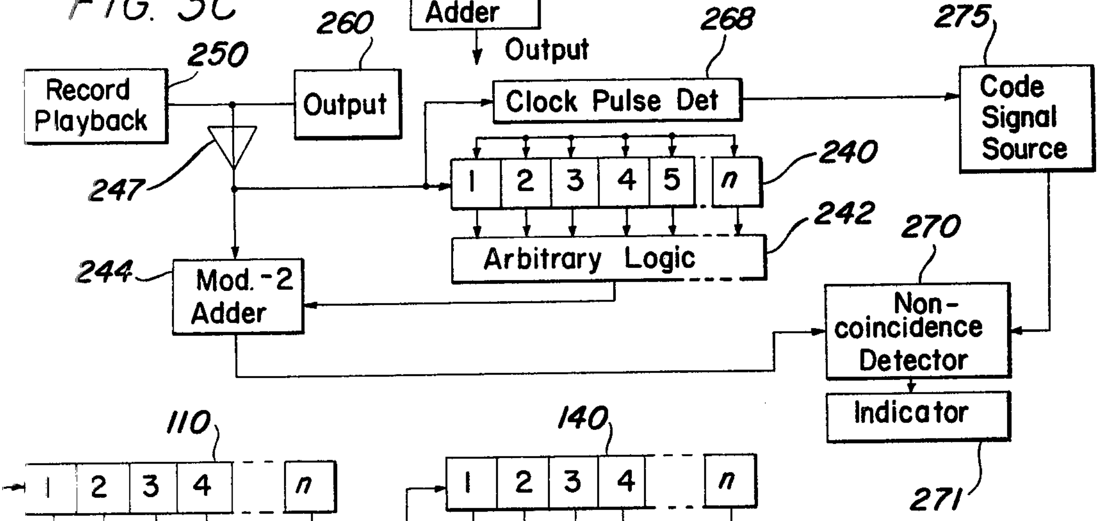
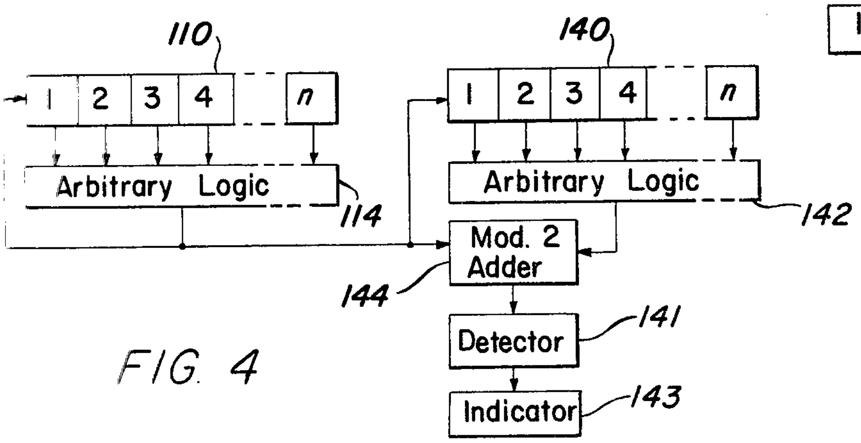
FIG. 4

CODED DATA TRANSMISSION SYSTEM

This is a continuation of application Ser. No. 481,021, filed Aug. 19, 1965, now abandoned.

The present invention relates generally to the transmission of information between two separated points and more particularly to a coded data transmission system including a novel transmitter and novel receiver which make possible the transmission of data between two points in a manner such that jamming attempts may be readily recognized by short term intermittent checking and also such that the possibility of an intruder being able to decode the stream of information is rendered remote.

In the transmission of information between two points it is frequently desirable to be able to transmit the information in a manner such that the intended recipient is able to correctly receive the information and yet undesired receipt and decoding of the information by third parties is avoided. Such equipment has been used in the past for military operations wherein it is important that the enemy is not able to receive the various types of information being transmitted between military units. In the use of such equipment it is desirable that means be provided for detecting when false signals are being transmitted since the same would tend to garble the transmitted information and hence result in the receipt of erroneous messages.

In addition to the military uses of such data transmission systems it would be advantageous to have available a system having the capability that information could be recorded and later such recorded information played back, and with the person later playing back the information contained on the record having the absolute assurance that the record had not been changed or the information thereon tampered with. Accordingly, it is an object of the present invention to provide an improved data transmission system adapted to permit the transmission of coded information between two points.

It is another object of the present invention to provide a simplified coding and decoding message transmission system wherein the likelihood of a third party being able to decipher the code being used is remote.

Another object of the present invention is to provide a recording system including protection means for making it possible to detect any alterations or attempted alterations in the recorded information.

It is a further object of the present invention to provide a simplified data transmission system making use of a simplified coding and decoding apparatus wherein attempts to jam or to insert erroneous information in the stream of information being received can be readily detected by intermittent short term checks at the receiver.

Another object of the present invention is to provide an improved coded information transmission system using high speed shift registers in the transmitter and in the receiver and wherein real time coincidence between the shifting of information in the transmitter and receiver is not required.

A further object of the present invention is to provide a simplified system for checking the proper operation of a high speed multi-stage shift register.

In accordance with the teachings of the present invention the output signals from a multi-stage binary shift register are applied to an arbitrary logic network in a manner such that any preselected combinations of conditions of the individual stages in the shift register will cause the arbitrary logic network to provide one or the other of two output signals. The output signal from the arbitrary logic network is applied to a binary half-adder or a unit which is commonly referred to in the art as a modulo-two-adder. A modulo-two-adder has the characteristic that when each of its two input circuits are simultaneously provided with "ones" or "zeros" the output circuit thereof is provided with a "zero" output. When the two input circuits are provided with signals such that one or the other (but not both) are provided with a "one" then the output circuit is provided with a "one" output. As used hereinafter the terms "one" and "zero" are meant to refer to the common terminology used in the binary art wherein two distinct signal levels are characterized as respectively representing a "one" or a "zero" in binary notation.

The second input circuit for the first modulo-two-adder is adpated to receive binary input data signals while the output circuit of the modulo-two-adder is connected to any suitable signal transmitter and is also connected to the input circuit of the first bistable storage unit in the shift register. A suitable clock pulse generator serves to provide timing signals in a conventional manner to the various stages in the shift register so that the shifting of information along the chain of bistable units will occur at a regular and controlled rate.

The receiver unit includes components substantially identical to those described for the transmitter but the manner in which the various components are connected differs substantially from the manner of connection of the components in the transmitter. That is, the receiver includes a multi-stage shift register having the same number of stages as does the shift register in the transmitter. The receiver similarly contains an arbitrary logic network which is identical to the arbitrary logic network in the transmitter. A second modulo-two-adder has a first input circuit connected to the output circuit of the arbitrary logic network in the receiver, and a second input circuit to which the signals from the transmitter are applied. The transmitted signals are simultaneously applied to the first stage of the multi-stage shift register of the receiver unit. A second clock pulse generator, adapted to provide periodic control signals at the same repetition rate as does the first clock pulse generator in the transmitter, is coupled with each of the bistable elements of the shift register in the receiver. Thus the arrangement is such that the transmitter and receiver each contain substantially identical shift registers, arbitrary logic networks, and clock pulse generators, as well as each including a modulo-two-adder. However, it should be noted that the circuit arrangement for the transmitter is such that the shift register can be referred to as a feed-back shift register in that the output signals from the shift register are passed through an arbitrary logic network, through a modulo-two-adder, and back to the input circuit for the shift register. The shift register in the receiver can be referred to as a feed-forward shift register, since the only signals applied to the input thereof are the output signals transmitted by the transmitter, with the output signals from the shift register in the receiver being passed through the arbitrary logic network and the modulo-two-adder where they are added directly in mod-two fashion to the input signals received by the receiver.

As described in greater detail hereinafter, the result of the combination of the above generally described transmitter and receiver is such that the state of the shift register in the receiver will become coincident with the state of the shift register in the transmitter after a period of time equal to n clock pulse time intervals. Then thereafter with the two arbitrary logic networks being set to identical modes, the shift registers in the transmitter and the receiver will remain in identical conditions. Thus if the transmitter is made to transmit a series of "zeros" either intermittently or continuously between message transfer times, the receiver output can be observed to see if jamming or "spoofing" is being attempted. That is, the output of the receiver unit will be zero unless an erroneous signal is received during the time when the input information circuit for the transmitter applies a continuing zero signal to the main modulo-two-adder in the transmitter. If an attempt is made to cause the transmission of erroneous information by jamming techniques, such attempt would be readily detected at the receiver by a presence of a "one" in the receiver output circuit.

When the shift registers in the transmitter and the receiver have been brought to coincidence (which always occurs in a time which is never longer than n clock pulse time intervals) the transmission of data can take place by the application of clocked binary information to the input circuit of the transmitter. When the information is applied to the input circuit of the transmitter, the contents of the shift register in the transmitter will, of course, be changed and will undergo such change at a known rate as a result of the cycling of the clock pulse generator. As a result the output circuit of the shift register and the arbitrary logic network in the transmitter will cause a changing code signal to be applied to one input of the modulo-two-adder. The information to be transmitted will then be added modulo-two to a changing code and thus the output of the modulo-two-adder will bear no resemblance to the information to be transmitted. The output of the mod-two adder is used to control the output of a conventional r-f transmitter. Accordingly, the signal information stream being transmitted by the r-f transmitter will bear no particular resemblance to the actual information being transmitted. By using a relatively long shift register so that there is no recurrence of the binary content thereof at short time intervals (for example with a ten stage binary shift register it would take at most 1024 shifts for the shift register to come back to its original condition, even assuming there was a continuing zero input from the data source), information concerning the logic network will be difficult to ascertain from the output signal train. The logic network itself can be constructed to undergo periodic changes so that even when all zeros are applied to the transmitter the contents of the feedback shift register follows no fixed pattern and, accordingly, deciphering of the output pulse train is practically impossible. By passing the output signals from the shift register through an arbitrary logic network which remains fixed during a given transmission the likelihood of anyone being able to decipher the transmitted information is extremely unlikely.

When the transmitted code stream is received by the receiver, the output signal from the arbitrary logic network of the transmitter is effectively removed from the code stream by a modulo-two-addition so that the result is an output code signal stream from the receiver which is identical to the code stream originally applied to the input circuit of the transmitter.

From the above it will be seen that the system also makes possible the accurate and rapid checking of the operation of a multi-stage shift register operating at a high speed. The only thing required for checking the accurate operation of the high speed shift register in the transmitter is to have one input circuit for the modulo-two-adder associated with the shift register being checked (in the "transmitter") maintained at one or the other of a one or a zero condition. The output circuit of the "receiver" will then continuously provide a one or a zero output if both shift registers are operating properly. Thus by having a shift register in the "receiver" which is known to be operating properly, it is a relatively simple task to check the operation of an unknown shift register.

In accordance with further embodiments of the present invention the transmitter described above is used to apply a background signal to a recording apparatus which is being used to record any desired information, as for example verbal information. As is well known, it is often essential that the recording made by a person and later played back be identical to the recording as originally made, with any attempt to alter the record being immediately detected. By recording a code stream obtained from the output of a transmitter such as that described, as a background signal on the recording medium, and then reading such recorded code stream at a later time when the record is being played, and passing such code stream information through the above-described receiver, attempts to alter the record would be detected. That is, any attempt to modify the recording would result in the loss or displacement of at least one binary bit and, of course, the loss of even one bit would result in the output signal from the receiver having other than a signal corresponding to the code signal applied as an input to the mod-two adder during recording. In one simplified system the mod-two adder in the "transmitter" is provided with all zeros during recording. The output of the receiver is then merely observed for the presence of a one as an indication of an attempt to alter the record.

The above as well as additional advantages and objects of the present invention will be more clearly understood from the following description when read with reference to the accompanying drawings.

FIG. 3A is a block diagram of a tamper-proof recording system making use of the teachings of the present invention.

FIG. 3B is a block diagram of a record playback system adapted for use with the recording system of FIG. 3A.

FIG. 3C is a block diagram of a system similar to that of FIG. 3B but including apparatus for using a changing code input on the recorder and on the playback to further prevent undetectable tampering with the record.

FIG. 4 is a system for checking the operation of high speed multi-stage shift registers.

Figure 1A:
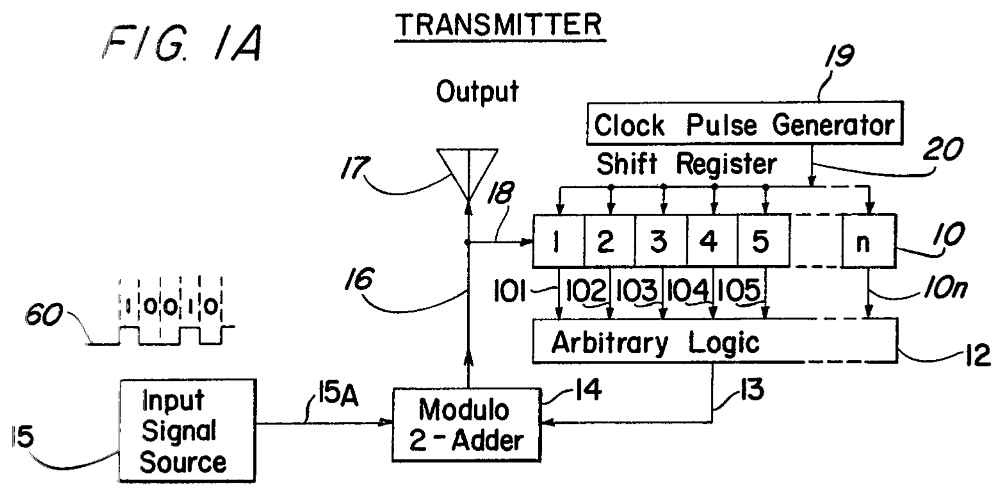
FIG. 1A is a block diagram of an improved coded information transmitter provided in accordance with the teachings of the present invention.

Referring now to the drawings and in particular to FIG. 1A the details of a preferred embodiment of the transmitter adapted for use in the data transmission system of the present invention will be described. It will be seen that the system includes a multi-stage shift register 10 which for purpose of illustration and explanation of the present invention will be referred to as a multi-stage bistable feed-back shift register 10 having individual bistable stages 1, 2, 3, 4, 5,–n where n can be any integer. Each of the binary stages 1–n may be a conventional flip-flop provided with a signal output circuit 101, 102, 103, 104, 105, 10*n*, which is connected as an input circuit for an arbitrary logic network 12. The arbitrary logic network 12 has a signal output circuit 13 which is connected to one of the input circuits for a modulo-two-adder 14 having a signal or data input circuit 15A connected thereto for the receipt of information to be transmitted. In FIG. 1A an input signal source 15 is shown connected to input circuit 15A. While other and various types of numeric systems can be used in accordance with the teachings of the present invention, the transmitter shown in FIG. 1A will be referred to for purpose of teaching the invention as operating in the binary system and therefore the input circuit 15A is provided with binary signals referred to as "zero" or "one" signals, as is common in the art. Such information could be the conventional teletype code or could be digitized speech which is well known and widely used at the present time.

The modulo-two-adder may also be referred to as a binary half-adder in that if each of its input circuits simultaneously receive a one, or simultaneously receive a zero, the output circuit 16 thereof will have a zero signal level. If either of the two input circuits for the modulo-two-adder 14 is at a one level, but the other is at a zero level, the output circuit 16 will be at a one level. It will be seen that the output circuit 16 is directly connected to a suitable r-f transmitter network 17 which can be any of a number known in the art. For example, the transmitter 17 can be a pulsed radio frequency transmitter adapted to be operated in an on-off mode or adapted to be continuously operated but made to operate at one or the other of two frequencies, one or the other of two phases, or any other suitable arrangement wherein two distinct types of signals are transmitted in accordance with the signal level of the output circuit 16 for the modulo-two-adder 14. A branch circuit 18 will be seen to be connected from the output circuit 16 of the modulo-two-adder 14 directly to the first stage of the shift register 10. A suitable clock pulse generator 19 will be seen to have a signal output circuit 20 which is connected to each of the binary stages of the multi-stage shift register 10 in a manner such that the clock pulse generator will serve to cause the advance of information down the shift register at a regular and controlled recurring rate.

Figure 1B:
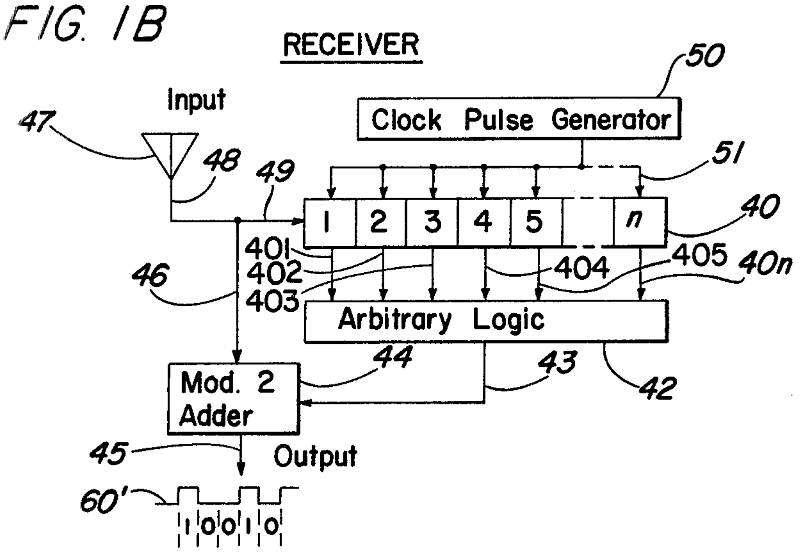
FIG. 1B is a block diagram of a coded information receiver making use of parts substantially identical to those of the transmitter in FIG. 1A, but with the various components being connected in a different circuit arrangement.

The receiver shown in FIG. 1B is adapted to cooperate with the transmitter of FIG. 1A to provide a complete data transmission system and will be seen to include components which are substantially identical to the components of the transmitter. The receiver includes a second binary shift register 40 (referred to as a feed-forward shift register) having a number of stages n which number is identical to the number of stages in the first binary shift register 10 of the transmitter. Each of the individual bistable stages of the second shift register 40 will be seen to have a signal output circuit 401, 402, 403, 404, 405, 40*n* with each of said output circuits of the bistable stages being connected as an input to the arbitrary logic network 42. Arbitrary logic network 42 is identical to the arbitrary logic network 12 in the transmitter. The arbitrary logic network 42 has a signal output circuit 43 which is connected as a first input to a second modulo-two-adder 44. A decoded signal output circuit 45 will be seen to be provided as the output circuit from the second modulo-two-adder 44. The second signal input circuit 46 for the second modulo-two-adder 44 is directly connected to the output circuit of the information receiving network 47. The receiver 47 is a conventional radio frequency receiver adpated to cooperate with and detect the signals from the r-f transmitter 17 and provide on its output circuit 48 binary signals corresponding to those applied to the r-f transmitter 17. The signal output circuit 48 for the receiver 47 is also connected to the input circuit 49 for the first or lowest order stage of the multi-stage shift register 40. A second clock pulse generator 50 which operates to provide recurring pulses at time intervals the same as the time intervals between the clock pulses of the first clock pulse generator 19 has a signal output circuit 51 directly connected to each of the stages of the second binary shift register 40.

The operation of the system thus far described is as follows. When information is to be transmitted a binary coded signal is applied to the input circuit 15A so that each of the binary bits will be added modulo-two to the output signal from the arbitrary logic network 13. As a result thereof the transmitter 17 will transmit a train of signals which represents the input signals 60 added modulo-two to the output binary signals from the arbitrary logic network 12. The output signals from the half-adder 14 are also applied to the input circuit for the first stage of the feed-back shift register 10. As a result thereof, upon the occurrence of a clock pulse from generator 19, the information in the shift register 10 will be advanced to the right with the condition of the lowest order stage in the shift register being determined by the input data signal added modulo-two to the output from the arbitrary logic network 12. Accordingly, it will be seen that since the shift register is continually undergoing a change in its condition the output signal from the arbitrary logic network 12 will be changing, controlled by the setting of the arbitrary logic network. As a result the binary signal to which the input signal is added modulo-two will be changing and therefore the output signals from the r-f transmitter 17 will appear as random signals bearing no immediately identifiable relationship to the applied information input signals.

Referring to FIG. 1B the manner in which the signals transmitted by transmitter 17 are decoded at the receiver will now be described. It will be assumed that the feed-forward shift register 40 in the receiver was initially in coincidence with the condition of the feed-back shift register 10 in the transmitter at the time when the transmission of information started. The manner in which the two shift registers are brought into coincidence will be described hereinafter.

Referring to FIG. 1B it will be seen that the r-f receiver 47 will receive the signal information transmitted by the r-f transmitter 17, and apply on its output circuit 48 binary coded signals corresponding to the binary coded output signals from the modulo-two adder 14 in the transmitter. Since the arbitrary logic network 42 is established as being identical to the arbitrary logic network 12, and since the feed-forward shift register 40 was initially in the same condition as was the feed-back shift register 10 it will be seen that the shift registers 10 and 40 receive identical inputs and thus the output signals from the arbitrary logic network 42 applied to the second modulo-two adder 44 will be identical to the signals applied from the arbitrary logic network 12 to the first modulo-two adder 14. The transmitted signal train will be seen to be applied over the circuit 46 as the second input for the second modulo-two adder 44. The result is that the output of mod-two adder 14 is added mod-two to the signal from logic network 12, which of course is itself the signal added mod-two to the input data from source 15. Thus it will be seen that the same signal is effectively added twice in modulo-two fashion to the original signal applied from the input signal source over circuit 15A to the first modulo-two adder 14. The result is that the original input signal will be provided on the signal output circuit 45 from the modulo-two adder 44 as the output signals 60'. This can be shown by the following set of logical equations wherein the plus sign (+) represents an addition being performed in modulo-two fashion. It should be mentioned that modulo-two addition is also frequently described in the art as applying signals to an "exclusive-or" gate.

| Input to 14 From Source 15 | | Output From Logic 13 | | Signal Transmitted, Received, and Applied To 44 | | Output From Logic 42 | | Output From 44 |
|---|---|---|---|---|---|---|---|---|
| 1 | + | 1 | = | 0 | + | 1 | = | 1 |
| 1 | + | 0 | = | 1 | + | 0 | = | 1 |
| 0 | + | 1 | = | 1 | + | 1 | = | 0 |
| 0 | + | 0 | = | 0 | + | 0 | = | 0 |

From the above it will be seen that the input signal applied to the transmission network will be transmitted in a coded fashion which bears no particular relationship to the applied signal information and yet the output signals from the modulo-two adder 44 will always correspond to the input signals applied to the modulo-two adder 14. It is of particular importance to note that the transmitter and the receiver can be time-displaced and need not be in real-time coincidence. That is, it is only necessary that the clock pulse generator 50 provide output signals at the same repetition rate as the clock pulse generator 19. It is not necessary that the output signals from the two clock pulse generators take place at the same real instant in time. With the present state of the clock pulse generation art, using local crystal oscillators, or digital timing extractors, these objectives are readily achieved and yet the necessity for a real time control link between the transmitter and the receiver is not required.

It was previously mentioned that the feed-forward shift register 40 would always come into coincidence with the feed-back shift register 10 with the coincidence occurring within n clock pulse time intervals. Referring to FIGS. 1A and 1B it will be seen that the output signals from the modulo-two adder 14 in the transmitting system of FIG. 1A are effectively directly applied to the lowest order stage of each of the two shift registers 10 and 40. Thus regardless of the conditions of the two shift registers at the time when information is to be initially transmitted, the two will come into coincidence after n shifts since each of the two are receiving identical input signals. If one considers the fact that the clock pulse rate in a typical system is in the megacycle range, then it will be seen that even in a system where shift registers having many stages are utilized coincidence between the two shift registers will occur in a very short time.

It should be noted that the system has the inherent capability to make possible an easy check to ascertain whether or not a third party is attempting to jam or garble the signal information. That is, it will be seen that the output signals 60' are identical to the input signals 60. Thus if the input signal source 15 provides a continuing series of zero signals, then the output from the mod-two adder 44 in the receiver will be zero only so long as no erroneous information is being received. The receipt of a single one in the output of the mod-two adder 44 would be an indication that a third party was attempting to jam the system. It should be noted that such third party would not be able to detect the fact that the input signal from the input signal source 15 was being maintained at zero since during such time the modulo-two adder 14 in the transmitter would still be providing a changing code pattern to the r-f transmitter 17 and hence to all external appearances useful coded information would still be undergoing transmission. Thus it will be seen that the detection of such jamming signals can be readily achieved by intermittent transmission of all zeros and corresponding intermittent observation of the output from the receiver for the appearance of a one.

From the above it will be seen that the present invention makes possible the checking of a high speed shift register such as the feed-back and feed-forward shift registers 10 and 40 merely by maintaining the signal on the signal input circuit 15A at a zero level and observing the output signal from the modulo-two adder 44 in the receiver. That is, the output circuit of the modulo-two adder 44 under such conditions will remain at a zero level only so long as the feed-back shift register 10 is operating properly. This method and apparatus for checking the proper operation of the feed-back shift register 10 is illustrated in FIG. 4 wherein it will be seen that the output signal from the arbitrary logic network 114 is connected directly as an input circuit for the second modulo-two adder 144 and as an input for the first stage for the feed-forward shift register 140. A "one" detector 141 is connected to the mod-two adder 144, and may for example be a bistable circuit which is changed from one condition to another upon receipt of a one from the mod-two adder 144. An indicator 143 driven by the detector 141 provides a visual indication of malfunction of one of the shift registers. By having one of the shift registers known to be in proper operation, it will be seen that the other is readily checked even though the two are being shifted at a very high rate by a common clock pulse generator (not shown). The apparatus illustrated in FIG. 4 is particularly useful in those cases where an extremely high speed feed-back shift register is to be checked for proper operation since without such a system it is practically an impossible task to ascertain whether or not a feed-back shift register is operating properly.

Referring now to FIG. 3A there is shown an improved recording system making use of the teachings of the present invention to provide a record which is essentially tamper proof in that any attempt to alter the information recorded by the system will be immediately detected when the record thus made is later played back. Thus it will be seen that the system of FIG. 3A includes a transmitter substantially the same as that shown in FIG. 1A in combination with a conventional recorder 200 which may for example be a magnetic tape recorder. A source of information to be recorded 218 will be seen to be connected as one of the signal input devices for the recorder 200. In one specific application of the system verbal information serves as source 218. It will be seen that the system includes a feed-back shift register 210 having the signal output circuits of the individual stages thereof connected to an arbitrary logic network 212 which in turn has its output circuit 213 connected as an input for the mod-two-adder 214. The output signals from the modulo-two-adder 214 are applied to the lowest order stage of the shift register 210 and also to the signal output device 217 which is adapted to provide output signals directly to the recorder 200. The output device 217 can be operated at a high frequency to avoid interference with signals from source 218, the output from device 217 being in binary form. In the embodiment of FIG. 3A, when used with the playback system of FIG. 3B, the code signal source 215 maintains one input to the mod-two-adder 214 at zero. Therefore the output of the logic network 212 is effectively fed directly (unaltered) to the output device 217.

In FIG. 3B there is illustrated a play-back device 250 which is adapted to play back the record made by the recorder 200. The output device 260 is a conventional audio speaker. The output signal from the record play-back apparatus 250 is applied to the input and demodulation device 247 which has its signal output circuit directly connected to the input circuit for the feed-forward shift register 240. The demodulated output signal from the demodulating input device 247 is simultaneously applied to a mod-two adder 244 which has as its second input circuit the output circuit from the arbitrary logic network 242. It will be seen that the arbitrary logic network 242 which is identical to the arbitrary logic network 212 is connected to each of the stages of the feed-forward shift register 240 in the manner described with reference to FIG. 1B. To avoid any problems which might normally be encountered by small speed differences between the rate of movement of the recording medium during recording versus the rate of movement of the recording medium during playback, the system of FIG. 3A can advantageously have the clock pulse generator 219 coupled with the recorder 200 (as shown by the dashed line in FIG. 3A) so that clock pulse signals are simultaneously recorded. As shown in FIG. 3B a clock pulse detector 248 is coupled to the demodulator 247 so that the previously recorded clock pulse signals will be detected by the clock pulse detector 248 and serve to control the shifting of information in the feed-forward shift register 240. The clock pulse detector 248 can also include a clock pulse extractor operating on the basis of digital timing extraction so that there is no need to record clock pulse signals. and yet variations in speed of the recording medium are avoided since the clock pulse signals for the playback are derived from the recorded information itself.

In operation it will be seen that the output signal from the mod-two adder 244 will remain at zero so long as the recorded check signals being demodulated and applied to the feed-forward shift register 240 are identical to those which were actually recorded during the making of the record. If any variance occurs the output from the mod-two adder 244 will change to a value other than zero and hence indicate that there has been attempt to modify the record previously made. As previously explained the two shift registers come into coincidence after n clock pulse time intervals. Thus in practice a short leader is recorded to assure coincidence of the two when playback of the desired information is initiated.

In FIG. 3C there is shown a more sophisticated record play-back apparatus which in addition to the components shown in FIG. 3B includes a noncoincidence detector 270 together with a code signal source 275. In using the apparatus of FIG. 3C, the recorder of FIG. 3A has its code signal source 215 made identical to the code signal source 275.

Thus the signals provided at the output of the code source 215 will be provided at the output of the mod-two adder 244 (FIG. 3C) during playback. The code source 275 also provides the same signals to the noncoincidence detector 270. Thus the indicator 271 will indicate any noncoincidence of the signals applied to detector 270 and thereby serve as a detection of any record tampering. The code signal sources 215 and 275 are preferably recorders having recorded code patterns with the signals therefrom being controlled in time by the clock pulse generator 219 and clock pulse detector 268, respectively.

Figure 2:
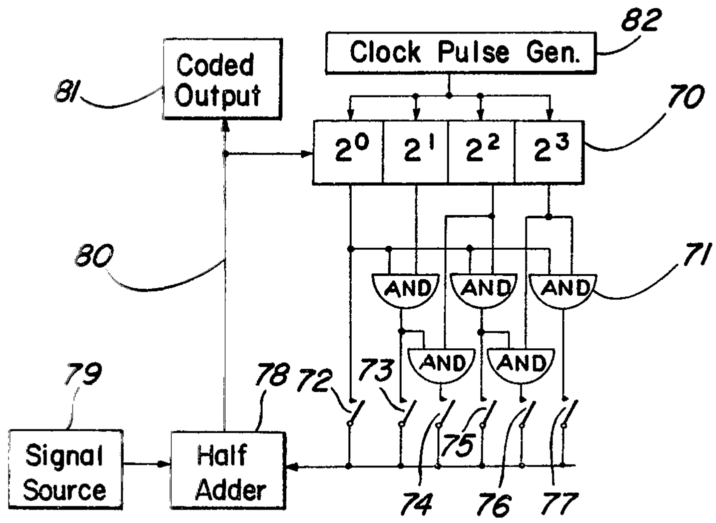
FIG. 2 is a more detailed block diagram of a four-stage binary feed-back shift register and modulo-two-adder in combination with one example of a simplified arbitrary logic network which may be used in the systems of FIGS. 1A and 1B.

While any of a number of well known arbitrary logic networks can be used in the systems of the present invention, there is shown for purpose of illustration in FIG. 2 a specific embodiment of a simplified logic network which includes a plurality of "AND" gates connected between the shift register and half-adder of a transmitter similar to that of FIG. 1A. Thus it will be seen that the four-stage shift register 70 is coupled through the AND gates 71 and selectively settable switches 72–77 to one of the input circuits for the half-adder 78. A signal source 79 serves as the signal source for the other input circuit of the half-adder 78. The output circuit 80 is directly connected to the coded output device 81 and is also connected to the input of the lowest order stage of the shift register 70. A clock pulse generator 82 is shown as controlling the shifting of information in the shift register 70 and would also control the timing of the application of signals from the signal source 79 to the half-adder 78. In the example of FIG. 2 it will be seen that the switch 72 is closed while the remaining switches 73–77 are opened. Thus the half-adder 78 will have a "one" on one of its inputs whenever the first bistable unit in the shift register 70 is in a "one" condition. At all other times the half-adder would receive a zero input from the shift register 70. A different one of the switches could of course be closed, the purpose of such an arrangement being to provide a system wherein the signal applied to the half-adder 78 will be controlled by the condition of the shift register 70 as modified by the arbitrary logic network. As explained previously, the arbitrary logic network associated with the receiver would be identical to the arbitrary logic network associated with the transmitter.

There has thus been disclosed an improved data transmission system and data recording system as well as a simplified apparatus and method for checking the operation of high speed shift registers. While the invention has been disclosed with reference to specific embodiments, it should be noted that the same was done only for purposes of teaching the inventive concepts. Thus it is to be understood that those changes and modifications which become obvious to a person skilled in the art from the teachings hereof are intended to be encompassed by the following claims.

What is claimed is:

1. An information transmitting and receiving system for enciphering and deciphering digital data comprising in combination:

first and second multi-stage shift registers; first and second arbitrary logic networks coupled respectively with said first and second shift registers, each of said networks having a pluarlity of inputs coupled to different stages of the associated shift register and responsive to the condition of such stages to provide an output signal;

a data signal input circuit for receiving an information signal to be transmitted;

a first modulo-two adder having first and second inputs coupled respectively to said data signal input circuit and to said first arbitrary logic network and having an output coupled to said first shift register to apply thereto the modulo-two sum of said first arbitrary logic network output signal and said information signal as said information signal is received thereby;

a data output circuit;

data transmission means coupled to transmit said modulo-two sum to the second shift register;

and a second modulo-two adder having first and second inputs coupled respectively to said data transmission means and to said second arbitrary logic network and having an output coupled to said data output circuit to apply thereto the modulo-two sum of said second arbitrary logic network output signal and the output signal of said data transmission means as the same are received by said second modulo-two adder.

2. An information-transmitting and receiving system as defined in claim 1 wherein said data transmission means includes:

a radio frequency transmitter having a control circuit coupled with said first shift register and a radio frequency receiver coupled to the first input of said second adder and to said second shift register and tuned to receive and demodulate the signals transmitted by said radio frequency transmitter.

3. An information transmitting and receiving system as defined in claim 1 and including clock pulse means, coupled with said shift registers and, for controlling the shifting of information therein.

4. An information transmitting system as defined in claim 3 wherein said clock pulse means includes: first and second independent clock pulse generators respectively coupled with said first and second shift registers and which cause the shifting of information therein at substantially the same rate.

5. A system as defined in claim 1 wherein said data transmission means includes:

recording means, coupled with the output of said first adder, for recording signals therefrom, and record playback means, coupled with the first input of said second adder and with said second shift register, for reproducing said recorded signals.

6. A system as defined in claim 5 and further including clock pulse generator means coupled with said first shift register and with said recording means, and clock pulse detection means coupled with said second shift register and with said record playback means.

7. A data encipherer comprising in combination:

a multi-stage shift register;

an arbitrary logic network having a plurality of inputs coupled to different stages of said shift register and responsive to the condition thereof to provide an output signal;

a data signal input circuit for receiving an information signal to be transmitted;

a modulo-two adder having first and second inputs coupled respectively to said data signal input circuit and to said arbitrary logic network and having an output coupled to said shift register to apply thereto the modulo-two sum of said arbitrary logic network output signal and said information signal as said information signal is received thereby;

and signal output circuit means coupled with said shift register.

8. A data encoder as defined in claim 7 wherein said signal output circuit means includes a radio frequency transmitter coupled with said adding network and adapted to provide output radio frequency signals representative of the output signals from said adder.

9. A data encoder as defined in claim 7 wherein said register includes n bistable stages, and wherein said adder comprises a modulo-two adder.

10. A data receiver adapted to receive and decode the individual fits of a previously encoded information-containing digital data signal comprising in combination:

a multi-stage shift register;

an arbitrary logic network having a plurality of inputs coupled to different stages of said shift register and responsive to the condition thereof to provide an output signal;

a data signal receiving circuit coupled with a selected stage of said shift register;

signal output circuit means;

and a first modulo-two adder having first and second signal input circuits respectively coupled with said data signal receiving circuit and with said arbitrary logic network and having an output coupled to said signal output circuit means to apply thereto the modulo-two sum of said arbitrary logic network output signal and said data signal as said data signal is received thereby.

11. A data receiving system as defined in claim 10 wherein said register includes n bistable stages, and wherein said adder comprises a modulo-two adder.

12. Circuit means for checking the operation of high speed shift registers comprising in combination: first and second multi-stage shift registers each having n stages; first and second identical arbitrary logic networks respectively coupled with said first and second shift registers and each adapted to provide a first signal determined by the condition of the associated register; circuit means coupling said first signal from said first arbitrary logic network to correspondng stages of said first and second registers; a modulo-two adding network having first and second signal input circuits respectively coupled with said arbitrary logic networks and, for receiving said respective first signals therefrom and for adding the same in modulo-two fashion; and signal detection means, coupled with the output circuit of said modulo-two adder, for providing an indication of a change in the signal level in the output circuit of said modulo-two adder.

13. A circuit as defined in claim 12 wherein each of said registers comprises n bistable units and wherein said detector means includes a bistable circuit coupled with the output of said modulo-two adder.

14. A data recording and playback system comprising in combination: first and second shift registers each having n stages; first and second identical logic networks respectively coupled with said first and second registers; first and second modulo-two adders respectively coupled to said first and second arbitrary logic networks; a data recorder; circuit means coupling the output of said modulo-two adder to the lowest order stage of said first register and to said data recorder; record playback means; and circuit means coupling said record playback means with an input for said second modulo-two adder and with the lowest order of said second shift register and including detector means for detecting from the record played back by said record playback means the signals recorded thereon corresponding to the output signals from said first modulo-two adder.

15. A system as defined in claim 14 and including a first code signal source coupled with said first modulo-two adder; a second code signal source identical to said first code signal source; and noncoincidence detection means, coupled with said second code signal source and with said second modulo-two adder for providing an output signal in response to noncoincidence between signals received thereby from said second code signal source and from said second modulo-two adder.

16. A system as defined in claim 15 and further including timing signal extraction means coupled with said second register and with said record playback means for deriving timing signals from the record played back by said record playback means for control of the shifting of information in said second shift register.

17. A system as defined in claim 14 where each of said registers comprises n bistable units connected in serial relationship with the lowest order stage of each of said shift registers being respectively coupled with the output circuit of said first modulo-two adder and with said record playback means.

18. Self-synchronous apparatus for randomizing a binary signal data pattern comprising:

a first shift register;

an arbitrary logic network for constructing a binary key signal from the digits stored in a plurality of selected stages of said first shift register;

means for combining said key signal with said data pattern to form a coded line signal;

a transmission channel for said line signal;

means for feeding said line signal to the input stage of said first shift register and to the transmitting end of said transmission channel;

a second shift register having an input stage connected to the receiving end of said transmission channel;

means for reconstructing said key signal from digits stored in a plurality of selected stages of said second shift register;

and means for combining said reconstructed key signal with said line signal to recover said data pattern.

19. An information transmitting and receiving system as defined in claim 1 wherein the data transmission means includes:

a radio frequency transmitter having a control circuit coupled with the input of the first shift register, and a radio frequency receiver coupled to the first input of the second adder and to the input of the second shift register.

20. A data scrambler for randomizing digital data for transmission comprising in combination:

a multi-stage shift register;

an arbitrary logic network having a plurality of inputs each coupled to a respective one of a plurality of selected stages of the shift register, and the network being responsive to the condition of the contents of such stages to provide an output binary key signal which is determined by the contents of each of the shift register stages to which the arbitrary logic inputs are connected;

an information-containing data signal input circuit for receiving an information signal to be transmitted;

a modulo-two adder having first and second inputs coupled, respectively, to the information-containing data signal input circuit and the output binary key signal of the arbitrary logic network, and having an output coupled to the input stage of the shift register to apply thereto the modulo-two sum of the arbitrary logic network output binary key signal and the information signal;

and a signal transmitting means, coupled to the output of the modulo-two adder, for transmitting the output of the modulo-two adder, which constitutes a transmitted data signal, to a receiver.

21. The apparatus of claim 20 wherein the output of the modulo-two adder is coupled to the first stage of the multistage shift register.

22. A data receiver/decoder adapted to receive and decode the individual bits of a previously encoded information-containing digital data signal comprising in combination:

a multi-stage shift register;

an arbitrary logic network having a plurality of inputs each coupled to a respective one of a plurality of selected stages of the shift register and the network being responsive to the condition of the content of such stages to provide an output binary key signal, which is determined by the contents of each of the shift register stages to which the arbitrary logic inputs are connected;

a transmitted data signal receiving circuit having an output coupled with a selected stage of the shift register;

signal output circuit means for providing an information-containing data signal from the receiver/decoder;

and a modulo-two adder having first and second signal input circuits respectively coupled with the output of the transmitted data signal receiving circuit and with the output binary key signal of the arbitrary logic network, and having the information-containing signal output circuit means coupled to the output of the modulo-two adder, to thereby output the modulo-two sum of the output binary key signal of the arbitrary logic network and the output of the transmitted data signal receiving circuit.

23. The apparatus of claim 22 wherein the selected stage is the first stage of the multistage shift register.

24. A data encoder for encoding the individual bits of an information-containing binary data signal for transmission, comprising:

encoding means for randomizing the information-containing data signal, the encoding means comprising:

data storage means having a plurality of stages for storing the previous n bits of the randomized information-containing data signal, and with the respective stages having a condition which reflects the respective condition of each of the previous n bits of the randomized information-containing data signal;

an arbitrary logic network means coupled to selected stages of the data storage means and responsive to the condition of the selected stages of the data storage means for generating a binary key signal based upon the condition of the selected stages of the data storage means;

and a modulo-two adding means for adding modulo-two respective bits of the information-containing data signal and of the key signal, with the output of the modulo-two adder being the randomized information-containing data signal encoded for transmission and also the input to the data storage means.

25. The apparatus of claim 24, further comprising:

the arbitrary logic means containing logic elements, and the logic elements being arranged in a suitable fashion for ensuring that recurrence of the same binary bit will not occur successively in the randomized digital data signal for greater than the length n of the storage capacity of the data storage means.

26. The apparatus of claim 24 wherein:

arbitrary logic network means remains responsive to the preselected combinations of binary conditions in the shift register for a finite transmission time and is then modified to be responsive to new preselected combinations of binary conditions in the shift register.

27. An apparatus for transforming a binary information-containing signal into a randomized signal for transmission by a transmitter, comprising:

a multi-stage shift register having n stages and an input stage;

logic means, connected to the shift register and responsive to preselected conditions of the contents in the stages of the shift register, for emitting a binary key signal based upon such preselected conditions;

combining means for combining, modulo-two, the key signal with the information-containing signal for yielding a randomized signal for transmission; and coupling means for applying the randomized signal to the transmitter and to the input stage of the shift register.

28. The apparatus of claim 27 wherein:

the logic means includes means for periodically changing the logic means to further enhance the difficulty of deciphering the randomized transmitted signal.

29. An apparatus for re-transforming a transmitted randomized digital data signal into an information-containing digital data signal, comprising:

a multi-stage shift register;

a signal combining means;

coupling means for applying the transmitted randomized signal to the input of the shift register and to an input of the signal combining means;

logic means, connected to the shift register and responsive to pre-selected conditions of the contents in the shift register stages for emitting a binary key signal based upon such preselected conditions;

key signal applying means connected between the output of the logic means and a second input of the signal combining means; and the signal combining means comprising a means for combining, modulo-two, the key signal and the transmitted randomized signal, for retransforming the transmitted randomized signal to the original information-containing signal.

30. The apparatus of claim 29, wherein:

the logic means remains unchanged during a finite transmission time.

31. The apparatus of claim 29, wherein:

the logic means includes means for periodically changing the logic means to further enhance the difficulty of deciphering the randomized transmitted signal.

32. An information transmitting and receiving system for enciphering and deciphering digital data comprising in combination:

first and second n stage shift registers;

first and second identical logic networks connected respectively to the first and second shift registers, each network having a plurality of inputs connected to pre-selected stages of its associated shift register and responsive to the condition of such stages for providing at its output a particular binary key signal;

a data signal input circuit for receiving an information-containing digital data signal to be randomized for transmission;

a first modulo-two adder having first and second inputs coupled respectively to the data signal input circuit and to the output of the first logic network, and having an output coupled to an input stage of the first shift register;

a transmitting means, coupled to the output of the first modulo-two adder, for transmitting the output of the modulo-two adder over a transmission medium to a receiver in the system;

the system further comprising at the receiver;

a randomized signal input circuit for supplying the received randomized signal to an input stage of the second shift register; and, a second modulo-two adder having first and second inputs coupled respectively to the randomized signal input circuit and to the output of the second logic network.

33. A communication system for communication of information represented in digital form, the system having a transmitting means and a receiving means adaptable for transmitting and receiving digital data over a communication medium and comprising:

input signal means at the transmitter for inputting a digital information-containing signal;

a self-synchronized digital scrambler having:

signal combining means for combining the digital information-containing signal with a binary key signal;

means for generating the binary key signal including:

a digital storage means for sequentially storing the digital output of the combining means;

a first logic means, coupled to the storage means and responsive to preselected combinations of the digital signals stored in the storage means, representing selected ones of the last n bits of the output of the combining means, for emitting one or the other of two binary conditions comprising the key signal;

transmitter means for transmission of the output of the combining means over the communication medium;

input signal means at the receiver for receiving the transmitted digital signal from the communication medium and means for transforming the received signal into the digital information-containing signal comprising:

a self-synchronizing de-scrambler having:

a second storage means for sequentially storing the received digital signal;

a second signal combining means for combining the received digital signal with a binary key signal to reform the original digital information-containing signal;

a second logic means, identical to the first logic means and coupled to the second storage means in the identical manner as the first logic means is coupled to the first storage means and responsive to preselected conditions of selected ones of the last n bits of the received digital signal in the same manner as is the first logic means, for generating the same key signal to be applied to the second signal combining means; and, the output of the second signal combining means comprising the original digital information-containing signal.

34. A data encryption apparatus comprising:

a multistage shift register having an input stage and a total of n stages;

a logic means, having n inputs, each connected to a respective one of the n stages of the shift register, for providing on its output a unique binary output responsive to the condition of the contents of each stage of the shift register;

an information-containing digital data input signal circuit means for providing information-containing binary data;

an encrypted data transmission means for transmitting the encrypted information-containing digital data; and, a modulo-two adder having first and second inputs and an output, with the first input connected to the information-containing digital data input signal circuit means, and the second input connected to the output of the logic means and the output of the modulo-two adder, comprising the encrypted information-containing digital data, connected to the encrypted data transmission means and to the input stage of the shift register.

35. A data decryption apparatus for decrypting an encrypted information-containing digital data signal which was encrypted for transmission to the data decryption apparatus, comprising:

a multistage shift register having an input stage and a total of n stages, with n equal to the number of stages in a shift register used for encryption;

a logic means, having n inputs, each connected a respective one of the n stages of the shift register, for providing on its output the same unique binary output responsive to the condition of the contents of each stage of the shift register, as is provided by an identical logic means used for encrypting the information-containing digital data signal for transmission;

a modulo-two adder having first and second inputs, and one output;

means for coupling the encrypted information-containing data signal as received to the input stage of the shift register and to the first input of the modulo-two adder;

the output of the logic means is connected to the second input of the modulo-two adder and the output of the modulo-two adder comprises the information-containing digital data signal which was encrypted for transmission.

36. A method of scrambling information-containing digital data for transmission comprising:

storing the last n transmitted bits in sequence in a digital data storage apparatus;

generating a particular key signal bit based upon preselected conditions of the digital data in a plurality of storage locations in the digital data storage apparatus;

combining, modulo-two, the key signal bit with the next sequential information-containing digital data bit to form a scrambled data bit for transmission.

37. A method of descrambling information-containing data scrambled for transmission, comprising:

storing the last n transmitted bits in sequence in a digital data storage apparatus;

generating the same particular key signal bit based upon the same preselected conditions of the digital data in the same plurality of storage locations as is used in the scrambling at the transmitter to form the same key signal bit as was formed in the transmitter;

combining, modulo-two, the key signal bit with the next sequential transmitted bit, as received, to reform the information-containing data bit.

38. A data encryption method for encrypting information-containing digital data for transmission comprising:

storing the last n transmitted data bits sequentially in a data storage apparatus;

performing a preselected logic operation upon the stored data word, consisting of each of the stored transmitted data bits, to form a particular key signal bit;

combining, modulo-two, the key signal bit with the next sequential information-consisting data bit to form a encoded bit for transmission.

39. A method of data decryption for decrypting encrypted information-containing digital data, encrypted for transmission comprising:

storing the last n received encrypted data bits sequentially in a digital data storage apparatus;

performing the same preselected logic operation, as was performed in encryption at the transmitter, upon the stored data word consisting of each of the stored received data bits, to form the same particular key signal bit as was formed at the transmitter;

combining, modulo-two, the key signal bit with the next sequential received encrypted data bit to form the information-containing digital data bit.

40. A system having a transmitting means for transforming the individual bits of an information-containing digital data signal into a randomized signal and a receiving means for unscrambling the received randomized digital data signal, the transmitting and receiving means adapted for a transmission and reception of data through a medium, comprising:

the combination at the transmitting means of:

a first multi-stage shift register;

a first logic means connected to the shift register and responsive to preselected conditions in the stages of the shift register to which the first logic means is connected for emitting a particular binary key signal;

a first combining means for combining the key signal with the information-containing signal for yielding a randomized signal for transmission; and, a means for applying the randomized signal from the combining means to the input of the shift register and presenting the randomized signal for transmission over the medium; and, the combination at the receiving means of:

a second multi-stage shift register;

a second signal combining means;

a coupling means for applying the transmitted randomized signal to the input of second shift register and to a first input of the second signal combining means;

a second logic means connected to the shift register and responsive to preselected conditions in the stages of the shift register to which the second logic means is connected for emitting a particular binary key signal to a second input of the second signal combining means; and, the output of the signal combining means comprising the information-containing signal.

* * * * *